(12) United States Patent
Yoshimura et al.

(10) Patent No.: US 6,498,279 B1
(45) Date of Patent: Dec. 24, 2002

(54) ULTRASTABLE ZEOLITE Y-CONTAINING HYDROGENATION CATALYST AND PROCESS FOR HYDROGENATING AROMATIC AND/OR HETEROCYCLIC AROMATIC COMPOUND-CONTAINING FEED

(75) Inventors: Yuji Yoshimura, c/o National Institute of Materials and Chemical Research of 1, Higashi 1-chome, Tsukuba-shi, Ibaraki-ken (JP); Hiroyuki Yasuda, c/o National Institute of Materials and Chemical Research of 1, Higashi 1-chome, Tsukuba-shi, Ibaraki-ken (JP); Toshio Sato, c/o National Institute of Materials and Chemical Research of 1, Higashi 1-chome, Tsukuba-shi, Ibaraki-ken (JP); Norihito Kijima, c/o National Institute of Materials and Chemical Research of 1, Higashi 1-chome, Tsukuba-shi, Ibaraki-ken (JP)

(73) Assignees: Agency of Industrial Science and Technology (JP); Yuji Yoshimura (JP); Hiroyuki Yasuda (JP); Toshio Sato (JP); Norihito Kijima (JP)

( * ) Notice: Subject to any disclaimer, the term of this patent is extended or adjusted under 35 U.S.C. 154(b) by 0 days.

(21) Appl. No.: 09/531,429

(22) Filed: Mar. 20, 2000

(30) Foreign Application Priority Data

May 20, 1999 (JP) .......................................... 11-140370

(51) Int. Cl.$^7$ ............................. B01J 29/08; B01J 29/12
(52) U.S. Cl. ........................... 585/277; 502/64; 502/66; 502/73; 502/74; 502/79; 502/65
(58) Field of Search .............................. 502/64, 65, 66, 502/73, 74, 79; 585/277

(56) References Cited

U.S. PATENT DOCUMENTS

| | | | | |
|---|---|---|---|---|
| 3,624,173 A | * | 11/1971 | Kirsch et al. | |
| 4,097,410 A | * | 6/1978 | Gladrow | |
| 4,437,978 A | * | 3/1984 | Chester et al. | |
| 4,584,287 A | * | 4/1986 | Ward | |
| 4,588,701 A | * | 5/1986 | Chiang et al. | |
| 4,735,928 A | * | 4/1988 | Best et al. | |
| 5,160,601 A | * | 11/1992 | Pecoraro | |

* cited by examiner

Primary Examiner—Stanley S. Silverman
Assistant Examiner—Christina Ildebrando
(74) Attorney, Agent, or Firm—Lorusso & Loud

(57) ABSTRACT

A hydrogenation catalyst including a carrier of ultrastable zeolite Y modified with at least one heavy rare earth element selected from ytterbium, gadolinium, terbium and dysprosium. At least one catalytic metal selected from palladium and platinum is supported on the carrier. A process for hydrogenating a feed containing an aromatic and/or a heterocyclic aromatic compound includes a step of contacting the feed with hydrogen in the presence of the above hydrogenation catalyst.

5 Claims, No Drawings

ULTRASTABLE ZEOLITE Y-CONTAINING HYDROGENATION CATALYST AND PROCESS FOR HYDROGENATING AROMATIC AND/OR HETEROCYCLIC AROMATIC COMPOUND-CONTAINING FEED

BACKGROUND OF THE INVENTION

This invention relates to a hydrogenation catalyst useful for treating aromatic and/or heterocyclic aromatic compounds-containing feed such as gas oils.

Exhaust gases from diesel engines contain particulates including soot, soluble organic fraction (SOF), sulfates and water. SOF contains a trace amount of various polycyclic aromatic compounds, such as benzo[a]pyrene, which are harmful to human bodies. Aromatic substances contained in gas oils are considered to be sources of such pollutants. Thus, there is a great demand for grade-up of gas oils, especially for reduction of aromatic and/or heterocyclic aromatic compounds therein.

In production of gas oils, a deep desulfurization treatment is generally carried out so that the sulfur content in the gas oil is maintained at 500 ppm or less. The deep desulfurization is usually performed at a high temperature and a high hydrogen pressure so as to compensate a reduction of catalytic performance with process time. However, an increase of the desulfurization temperature has a problem because hydrogenated products are apt to undergo dehydrogenation to form aromatic compounds. To cope with this problem, use of a platinum or palladium catalyst having a high hydrogenation activity under mild conditions has been proposed (for example, U.S. Pat. Nos. 4,640,764, 4,960,505, 5,391,291, 5,147,526, 5,151,172, 5,271,823 and 5,308,814, EP-B-0303332 and EP-A-0519573. Such a noble metal catalyst, however, causes a problem of poisoning by sulfur compounds.

In Collected Abstracts of Lecture for Presentation of Reports in the 26th Meeting of the Society of Petroleum/Petroleum Chemistry (1996), it is reported that a catalyst containing Pd and/or Pt supported on an ultrastable zeolite Y carrier can partly solve the problem of catalyst poisoning. JP-A-H9-239018 discloses a hydrogenation catalyst having an improved resistance to sulfur poisoning and containing Pd and Pt supported on a zeolite catalyst which has been modified with cerium, lanthanum, magnesium, calcium or strontium.

The known catalyst, however, has been found to be poisoned with sulfur when a basic nitrogen compound is present in the oil feed or when a basic nitrogen compound or ammonia is formed in situ during the hydrogenation treatment.

SUMMARY OF THE INVENTION

It is, therefore, an object of the present invention to provide a dehydrogenation catalyst which is devoid of the drawbacks of the conventional catalysts.

Another object of the present invention is to provide a dehydrogenation catalyst which exhibits a high hydrogenation activity, which is resistant to sulfur compounds and nitrogen compounds inclusive of ammonia and which has a long catalyst life.

It is a further object of the present invention to provide a process which can hydrogenate an aromatic and/or heterocyclic aromatic compounds-containing feed such as gas oils.

In accomplishing the foregoing objects, there is provided in accordance with the present invention a hydrogenation catalyst comprising a carrier of ultrastable zeolite Y modified with at least one heavy rare earth element selected from the group consisting of ytterbium, gadolinium, terbium and dysprosium, and at least one catalytic metal supported on said carrier and selected from the group consisting of palladium and platinum.

In another aspect, the present invention provides a process for hydrogenating a feed containing an aromatic and/or a heterocyclic aromatic compound, comprising contacting said feed with hydrogen in the presence of the above hydrogenation catalyst.

The present invention also provides a carrier comprising ultrastable zeolite Y modified with at least one heavy rare earth element selected from the group consisting of ytterbium, gadolinium, terbium and dysprosium.

As compared with a conventional Pd and Pt-supported, Ce-modified zeolite catalyst, which is known to have the highest hydrogenation activity among the known Pd and Pt-supported zeolite catalysts, the catalyst according to the present invention exhibits superior hydrogenation activity. Thus, the catalyst of the present invention can catalyze hydrogenation of aromatic or heteroaromatic compounds into aliphatic or heterocyclic rings, which may also be accompanied with cleavage of the rings. Yet, the catalyst of the present invention exhibits high resistance to poisoning by sulfur and nitrogen compounds contained in a raw material feed or formed in situ during the hydrogenation.

Other objects, features and advantages of the present invention will become apparent from the detailed description of the preferred embodiments to follow.

DETAILED DESCRIPTION OF THE PREFERRED EMBODIMENTS OF THE INVENTION

In the present invention, ultrastable zeolite Y modified with at least one heavy rare earth element is used as a carrier for supporting at least one catalytic metal component. "Ultrastable zeolite Y" is well known in the art and described in, for example, U.S. Pat. Nos. 3,293,192 and 3,402,996 and the publication, Society of Chemical Engineering (London) Monograph Molecular Sieves, page 186 (1968), the teachings of which are hereby incorporated by reference herein. The ultrastable zeolite Y generally has a molar ratio of $SiO_2/Al_2O_3$ of 5.0–1,000, preferably 10–20.

The ultrastable zeolite Y is modified with at least one heavy rare earth element selected from the group consisting of ytterbium (Yb), gadolinium (Gd), terbium (Tb) and dysprosium (Dy). The modification of the ultrastable zeolite Y with a heavy rare earth element may be achieved by ion exchange of proton of the zeolite Y with the heavy rare earth element or by impregnation of the zeolite Y with the heavy rare earth element. The amount of the heavy rate earth element in the carrier is generally 0.002–0.1 part by weight, preferably 0.01–0.5 part by weight, per part by weight of the ultrastable zeolite Y, when ion exchange is adopted for the modification of the zeolite Y. In the case of the impregnation, the amount of the heavy rate earth element is generally 0.005–0.7 part by weight, preferably 0.02–0.25 part by weight, per part by weight of the ultrastable zeolite Y.

Composited with or supported on the modified ultrastable zeolite Y carrier is at least one catalytic metal selected from palladium (Pd) and platinum (Pt). The support of the catalytic metal on the carrier may be achieved by, for example, impregnation. The catalytic metal component may be present as an elemental metal, a sulfide or a mixture thereof. If desired, one or more auxiliary metal components, such as rhodium (Rh), iridium (Ir) and rhenium (Re) may be additionally supported on the carrier by, for example, impregnation.

The amount of the catalytic metal is generally 0.3–7 parts by weight per 100 parts by weight of the carrier. More particularly, when palladium is used by itself as the catalytic metal component, suitable amount of palladium is 0.3–4 parts by weight, more preferably 0.7–1.6 parts by weight, per 100 parts by weight of the carrier. When platinum only is used, the amount thereof is preferably 0.3–7 parts by weight, more preferably 0.5–5 parts by weight, per 100 parts by weight of the carrier. When both palladium and platinum are used in combination, the amounts of the palladium and platinum are preferably 0.3–3.5 parts by weight and 0.2–1.6 parts by weight, respectively, per 100 parts by weight of the carrier, more preferably 0.7–1.4 parts by weight and 0.3–0.6 parts by weight, respectively, per 100 parts by weight of the carrier, with a total amount of the palladium and platinum being preferably 0.3–5 parts by weight, preferably 0.5–3 parts by weight, per 100 parts by weight of the carrier.

It is preferred that palladium and platinum be used together for reasons of obtaining very excellent resistance to catalytic poisoning. In this case, an atomic ratio Pd/Pt of the palladium to the platinum is preferably in the range of 9:1 to 1:1, more preferably 5:1 to 3:2. An atomic ratio M/(Pd+Pt) of the heavy rare earth element M to a total of the palladium and the platinum is preferably in the range of 16:1 to 1:5, more preferably 9:1 to 1:1.

The catalyst of the present invention which may be any desired shape such as powder, pellets, granules, a cylinder and a plate is useful for hydrogenating compounds having an aromatic or heteroaromatic ring. Examples of aromatic rings include a benzene ring, a naphthalene ring, an anthracene ring and a phenanthrene ring. Examples of heteroaromatic rings include a pyrrole ring, a furan ring, a benzofuran ring, a thionaphthene ring, a thiophene ring, an indole ring, an oxazole ring, a carbazole ring, a pyrane ring, a quinoline ring, an isoquinoline ring, picoline ring, a thiazole ring, a pyrazole ring, a pyridine ring, a toluidine ring, an acridine ring, a pyridazine ring, a pyrimidine ring, a pyrazine ring, a phthalazine ring and a quinoxaline ring. It is without saying that the catalyst of the present invention is effective in hydrogenating various other compounds having groups capable of being hydrogenated, such as double bonds of cyclic compounds, olefinic double bonds, carbonyl groups and nitrile groups.

The catalyst of the present invention is particularly effective to hydrogenate hydrocarbon oils containing aromatic and/or heteroaromatic compounds, especially gas oils. Hydrogenation of a gas oil is preferably performed at a temperature of 250–350° C., more preferably 270–330° C. and a hydrogen partial pressure of 35–80 kg/cm$^2$, more preferably 40–65 kg/cm$^2$. By the hydrogenation treatment of the gas oil, not only an aromatic content thereof is reduced but also a sulfur content is decreased as a result of hydrogenation of aromatic groups in sulfur compounds.

The following examples will further illustrate the present invention.

EXAMPLE 1
Preparation of Catalyst

A commercially available ultrastable zeolite Y (trade name: HSZ-360HUA manufactured by Toso Inc.; SiO$_2$/Al$_2$O$_3$: 13.9; the ultrastable zeolite Y will be hereinafter referred to as USY) was modified with a heavy rare earth metal by an ion exchange treatment. Thus, about 15 g of USY were mixed with 3 dm$^3$ of an aqueous solution containing 0.16 mol·dm$^{-3}$ of a heavy rare earth metal salt of acetic acid with stirring at room temperature for 24 hours. The mixture was then filtered, washed with purified water and then dried at 383K overnight, thereby obtaining a Yb-containing USY carrier (Yb-USY) having a Yb content of 2.2% by weight, a Gd-containing USY carrier (Gd-USY) having a Gd content of 2.0% by weight, a Tb-containing USY carrier (Tb-USY) having a Tb content of 2.0% by weight, and a Dy-containing USY carrier (Dy-USY) having a Dy content of 2.0 % by weight, all based on the carrier.

On each of the carriers thus obtained, Pd and Pt were composited by impregnation. Thus, 0.109 g of [Pd(NH$_3$)$_4$]Cl$_2$ and 0.039 g of [Pt(NH$_3$)$_4$]Cl$_2$ were dissolved in 5.5 cm$^3$ of purified water. This solution was then absorbed and impregnated in 5.0 g of each of the above carriers placed in an evacuated vessel. The impregnated carrier was dried under vacuum at 333K for 6 hours and then shaped into a disk. This was pulverized and sieved to have a particle size in the range of 22–48 mesh, thereby obtaining a Pd- and Pt-containing catalyst (Pd-Pt/Yb-USY, Pd-Pt/Gd-USY, Pd-Pt/Tb-USY, Pd-Pt/Dy-USY) having a Pd content of 0.82% by weight and Pt content of 0.38% by weight based on the catalyst. The product was stored in a desiccator saturated with an aqueous ammonium chloride solution.

EXAMPLE 2
Preparation of Catalyst

A commercially available ultrastable zeolite Y (USY) was modified with a heavy rare earth metal by an impregnation method. Thus, about 15 g of USY were immersed in 16.5 cm3 of an aqueous solution containing a quantity of a heavy rare earth metal salt of acetic acid. The mixture was dried at 383K overnight, thereby obtaining a Yb-containing USY carrier (Yb-USY) having a Yb content of 2.5% by weight, a Gd-containing USY carrier (Gd-USY) having a Gd content of 2.5% by weight, a Tb-containing USY carrier (Tb-USY) having a Tb content of 2.5% by weight, and a Dy-containing USY carrier (Dy-USY) having a Dy content of 2.5% by weight, all based on the carrier. The amounts the metal salts used were 0.939 g of Yb(CH$_3$COO)$_3$·4H$_2$O, 0.993 g of Gd(CH$_3$COO)$_3$·4H$_2$O, 0.986 g of Tb(CH$_3$COO)$_3$·4H$_2$O and 0.973 g of Dy(CH$_3$COO)$_3$·4H$_2$O.

On each of the carriers thus obtained, Pd and Pt were composited by impregnation. Thus, 0.109 g of [Pd(NH$_3$)$_4$]Cl$_2$ and 0.039 g of [Pt(NH$_3$)$_4$]Cl$_2$ were dissolved in 5.5 cm$^3$ of purified water. This solution was then absorbed and impregnated in 5.1 g of each of the above carriers placed in an evacuated vessel. The impregnated carrier was dried under vacuum at 333K for 6 hours and then shaped into a disk. This was pulverized and sieved to to have a particle size in the range of 22–48 mesh, thereby obtaining a Pd- and Pt-containing catalyst (Pd-Pt/Yb-USY, Pd-Pt/Gd-USY, Pd-Pt/Tb-USY, Pd-Pt/Dy-USY) having a Pd content of 0.82% by weight and Pt content of 0.38% by weight based on the catalyst. The product was stored in a desiccator saturated with an aqueous ammonium chloride solution.

Comparative Example 1
Preparation of Catalyst

Known Pd- and Pt-containing, Ce-modified USY catalyst (Pd-Pt/Ce-USY) was prepared according to JP-A-H11-57482.

Thus, USY was modified with cerium by an ion exchange treatment. About 10 g of USY were mixed with 2 dm$^3$ of an aqueous solution containing 0.1 mol·dm$^{-3}$ of a Ce salt of acetic acid with stirring at room temperature for 24 hours.

The mixture was then filtered, washed with purified water and then dried at 383K overnight, thereby obtaining a Ce-containing USY carrier (Ce-USY) having a Ce content of 1.8% by weight based on the carrier.

On the thus obtained carrier, Pd and Pt were composited by impregnation. Thus, 0.109 g of $[Pd(NH_3)_4]Cl_2$ and 0.039 g of $[Pt(NH_3)_4]Cl_2$ were dissolved in purified water to obtain a 10 cm$^3$ solution. This solution (7.36 cm$^3$) was then absorbed and impregnated in 4.95 g of the above carrier placed in an evacuated vessel. The impregnated carrier was dried under vacuum at 333K for 6 hours and then shaped into a disk. This was pulverized and sieved to have a particle size in the range of 22–48 mesh, thereby obtaining a Pd- and Pt-containing catalyst (Pd-Pt/Ce-USY) having a Pd content of 0.82% by weight and Pt content of 0.38% by weight based on the catalyst. The product was stored in a desiccator saturated with an aqueous ammonium chloride solution.

Comparative Example 2
Preparation of Catalyst

Known Pd- and Pt-containing USY catalyst (Pd-Pt/USY) was prepared according to JP-A-H11-57482.

Thus, Pd and Pt were composited on USY carrier by impregnation. In purified water, 0.109 g of $[Pd(NH_3)_4]Cl_2$ and 0.039 g of $[Pt(NH_3)_4]Cl_2$ were dissolved to obtain a 10 cm$^3$ solution. This solution (7.36 cm$^3$) was then absorbed and impregnated in 4.95 g of the USY carrier placed in an evacuated vessel. The impregnated carrier was dried under vacuum at 333K for 6 hours and then shaped into a disk. This was pulverized and sieved to have a particle size in the range of 22–48 mesh, thereby obtaining a Pd- and Pt-containing catalyst (Pd-Pt/USY) having a Pd content of 0.82% by weight and Pt content of 0.38% by weight based on the catalyst. The product was stored in a desiccator saturated with an aqueous ammonium chloride solution.

EXAMPLE 3
Hydrogenation

Two kinds of materials (A) and (B) having the formulations shown below were treated with each of the above catalysts:

Feed (A):

| Tetralin | 30% by weight |
|---|---|
| Dibenzothiophene | 0.3% by weight |
| n-Hexadecane | 69.7% by weight |

Feed (B):

| Tetralin | 30% by weight |
|---|---|
| Dibenzothiophene | 0.3% by weight |
| n-Butylamine | 0.01% by weight |
| n-Hexadecane | 69.69% by weight |

Thus, the feed A had a sulfur content of 500 ppm by weight, while the feed B had a sulfur content of 500 ppm by weight and a nitrogen content of 20 ppm by weight.

As a reactor, a stainless steel pipe (SUS316) having a length of 0.6 m and an inside diameter of ⅙ inch was used. The catalyst was packed in the reactor. Small stainless steel (SUS304) balls with an outer diameter of 2 mm were packed in the reactor at a position upstream of the packed catalyst layer so that a reaction feed was heated upon contact with a mass of the stainless steel balls. A sheath made of a stainless steel (SUS316) with an outer diameter of ⅛ inch extended through the packed catalyst layer. A thermocouple was inserted into the sheath to measure temperature of the catalyst layer. The reactor was covered with a brass cylinder having an inside diameter of 4.5 mm and a length of 0.4 m so that the reactor was heated uniformly. The reactor with the brass cylinder was placed in an electric oven.

The raw material feed was introduced into the reactor using a micro-pump and allowed to pass through the reactor in an up-flow mode. The feed rate was determined as a rate of decrease of the raw material contained in a raw material storage vessel placed on an electronic balance. The feed rate of hydrogen gas was controlled with a mass flow controller.

Before the initiation of the hydrogenation reaction, the catalyst layer in the reactor was subjected to a reduction treatment. Thus, hydrogen gas was passed through the catalyst layer for 3 hours at a rate of 100 cm$^3$/minute at ambient pressure, while increasing the temperature to 573K at a rate of 0.5K/minute. Thereafter, the catalyst layer was allowed to be cooled to 553K and the pressure of hydrogen was controlled to a predetermined level. Then, the raw material feed was introduced into the reactor. The reaction conditions were as follows:

Hydrogen pressure: 3.9 MPa

Hydrogen feed rate: 2.46 dm$^3$/hour

Reaction temperature: 553K

Feed rate of raw material: 4 g/hour

Amount of catalyst: 0.25 g

Space velocity (WHSV): 16 hour$^{-1}$

Volume ratio of hydrogen to raw material feed: 500

The reaction product was discharged from the top of the reactor and passed through a pressure reducing valve into ambient pressure. The product was then separated into a liquid product and a gas. The liquid product was occasionally sampled for the measurement of tetralin hydrogenation (dearomatization) efficiency (%) by a gas chromatography (GC-9A manufactured by Shimadzu Corporation) equipped with FID and a capillary column (Hewlett-Packard Ultra 1, inside diameter: 0.2 mm, length: 50 m). The results (dearomatization efficiency at 24 hours after the commencement of the hydrogenation treatment of the raw material feed) are summarized in Table 1.

From the results shown in Table 1, it is apparent that the catalyst according to the present invention exhibits superior dearomatization efficiency.

TABLE 1

| | | Dearomatization Efficiency (%) | |
|---|---|---|---|
| Example | Catalyst | Feed A (S: 500 ppm) (N: free) | Feed B (S: 500 ppm) (N: 20 ppm) |
| Example 1 | Pd-Pt/Yb-USY | 51.2 | 34.1 |
| | Pd-Pt/Gd-USY | 43.5 | 21.0 |
| | Pd-Pt/Tb-USY | 42.0 | 19.5 |
| | Pd-Pt/Dy-USY | 41.3 | 18.0 |
| Example 2 | Pd-Pt/Yb-USY | 56.1 | 40.0 |
| | Pd-Pt/Gd-USY | 46.3 | 23.2 |
| | Pd-Pt/Tb-USY | 41.8 | 21.0 |
| | Pd-Pt/Dy-USY | 42.3 | 19.3 |
| Comparative Example 1 | Pd-Pt/Ce-USY | 40.8 | 17.8 |
| Comparative Example 2 | Pd-Pt/USY | 31.5 | 4.5 |

EXAMPLE 4
Hydrogenation of Gas Oil

Using Pd-Pt/Yb-USY catalyst obtained in Example 1 (ion exchange), Pd-Pt/Yb-USY catalyst obtained in Example 2 (impregnation) and Pd-Pt/Ce-USY obtained in Comparative Example 1 were each tested for measurement of their gas oil hydrogenation activity. The property of the gas oil feed was as follows:

Specific gravity (15/4° C.): 0.829

Sulfur content: 244 ppm by weight

Nitrogen content: 16 ppm by weight

Total aromatic content: 26.3% by weight
  monocyclic: 22.2% by weight
  bicyclic: 4.0% by weight
  polycyclic (3 or more): 0.1% by weight Distillation characteristics
  10% recovered: 234° C.
  50% recovered: 281° C.
  90% recovered: 336° C.

As a reactor, a stainless steel pipe (SUS316) having a length of 0.6 m and an inside diameter of ⅜ inch was used. The catalyst was packed in the reactor. Small stainless steel (SUS304) balls with an outer diameter of 2 mm were packed in the reactor at a position upstream of the packed catalyst layer so that a reaction feed was heated upon contact with a mass of the stainless steel balls. A sheath made of a stainless steel (SUS316) with an outer diameter of ⅛ inch extended through the packed catalyst layer. A thermocouple was inserted into the sheath to measure temperature of the catalyst layer. The reactor was covered with a brass cylinder having an inside diameter of 4.5 mm and a length of 0.4 m so that the reactor was heated uniformly. The reactor with the brass cylinder was placed in an electric oven.

The raw material feed was introduced into the reactor using a micro-pump and allowed to pass through the reactor in an up-flow mode. The feed rate was determined as a rate of decrease of the raw material contained in a raw material storage vessel placed on an electronic balance. The feed rate of hydrogen gas was controlled with a mass flow controller.

Before the initiation of the hydrogenation reaction, the catalyst layer in the reactor was subjected to a reduction treatment. Thus, hydrogen gas was passed through the catalyst layer for 3 hours at a rate of 100 cm³/minute at ambient pressure, while increasing the temperature to 573K at a rate of 0.5K/minute. Thereafter, the catalyst layer was allowed to be cooled to 553K and the pressure of hydrogen was controlled to a predetermined level. Then, the raw material feed was introduced into the reactor. The reaction conditions were as follows:

Hydrogen pressure: 3.9 MPa

Hydrogen feed rate: 2.46 dm³/hour

Reaction temperature: 553–573K

Feed rate of raw material: 4 g/hour

Amount of catalyst: 1.0 g

Space velocity (WHSV): 4 hour$^{-1}$

Volume ratio of hydrogen to raw material feed: 500

The reaction product was discharged from the top of the reactor and passed through a pressure reducing valve into ambient pressure. The product was then separated into a liquid product and a gas. The liquid product was periodically sampled for the analysis by a supercritical gas chromatography (600SFC manufactured by Dionex Corporation) equipped with an FID detector. Coulometric titration using a sulfur analyzing device (TS-02 manufactured by Mitsubishi Chemical Corporation) was adopted for the analysis of sulfur. The results at 100 hours after the commencement of the hydrogenation treatment of the raw material feed are summarized in Table 2.

From the results shown in Table 2, it is appreciated that the catalyst according to the present invention exhibits superior dearomatization efficiency and desulfurization efficiency even at a reaction temperature lower than that used for the conventional catalyst.

TABLE 2

| Catalyst | Pd-Pt/Yb-USY obtained in Example 1 (ion exchange) | Pd-Pt/Yb-USY obtained in Example 2 (impregnation) | Pd-Pt/Ce-USY obtained in Comparative Example 1 (ion exchange) |
| --- | --- | --- | --- |
| Reaction Temperature | 563 K | 563 K | 573 K |
| Total Aromatics in Hydrogenated Product (wt %) | 6.8 | 5.9 | 8.5 |
| Dearomatization Efficiency (%) | 74.1 | 77.6 | 67.7 |
| Sulfur content in Hydrogenated Product (wt %) | 12 | 10 | 43 |
| Desulfurization Efficiency (%) | 95.1 | 95.9 | 82.4 |

EXAMPLE 5

In a manner similar to that described in Example 1, a Pd/Yb-USY catalyst having a Pd content of 1.2% by weight and a Pt/Yb-USY having a Pt content of 1.2% by weight were prepared. Each of these catalysts was tested for the dearomatization efficiency in the same manner as that described in Example 3 using Feed A as a raw material feed. The aromatization efficiency (tetralin hydrogenation efficiency) at 24 hours after the commencement of the hydrogenation treatment was 32.0% in the case of the Pd/Yb-USY catalyst and 27.2% in the case of the Pt/Yb-USY catalyst.

What is claimed is:

1. A hydrogenation catalyst comprising a carrier of ultrastable zeolite Y modified with at least one heavy rare earth element selected from the group consisting of ytterbium, gadolinium, terbium and dysprosium, and, as a catalytic metal, a combination of palladium and platinum supported on said carrier;
  wherein said palladium and platinum are present in amount of 0.3–3.5 parts and 0.2–1.6 parts, respectively, per 100 parts by weight of said carrier;
  wherein an atomic ratio Pd/Pt of said palladium to said platinum is in the range of 9:1 to 1:1;
  wherein an atomic ratio M/(Pd+Pt) of said heavy rare earth element M to a total of said palladium and said platinum is in the range of 16:1 to 1:5; and
  wherein said carrier is obtained by subjecting ultrastable zeolite Y to an impregnation treatment with an aqueous solution containing said heavy rare earth element and wherein said heavy rare earth element is present in said carrier in an amount of 0.005–0.7 part by weight per part by weight of said ultrastable zeolite Y.

2. A process for hydrogenating a feed containing an aromatic and/or a heterocyclic aromatic compound, comprising contacting said feed with hydrogen in the presence of a hydrogenation catalyst according to claim 1.

3. A process as claimed in claim 2, wherein said feed is a gas oil.

4. A process as claimed in claim 2, wherein said hydrogenating is performed at a temperature of 250–350° C. and a hydrogen partial pressure of 35–80 kg/cm$^2$.

5. A carrier comprising ultrastable zeolite Y modified with at least one heavy rare earth element selected from the group consisting of ytterbium, gadolinium, terbium and dysprosium; and wherein said carrier is obtained by subjecting ultrastable zeolite Y to an impregnation treatment with an aqueous solution containing said heavy rare earth element and wherein said heavy rare earth element is present in said carrier in an amount of 0.005–0.7 part by weight per part by weight of said ultrastable zeolite Y.

* * * * *